United States Patent [19]
Nishimoto et al.

[11] Patent Number: 5,720,361
[45] Date of Patent: Feb. 24, 1998

[54] TORQUE SENSING POWER STEERING DEVICE WITH ABNORMALITY DETECTION, DEAD ZONE DETECTION AND POWER ASSIST MOTOR INHIBITION

[75] Inventors: Mitsuhiko Nishimoto, Kashihara; Hideki Higashira, Ikoma, both of Japan

[73] Assignee: Koyo Seiko Co., Ltd., Osaka, Japan

[21] Appl. No.: 542,252

[22] Filed: Oct. 12, 1995

[30] Foreign Application Priority Data

Oct. 12, 1994 [JP] Japan .................. 6-246536
Jun. 27, 1995 [JP] Japan .................. 7-161177

[51] Int. Cl.$^6$ ............................................. B62D 5/04
[52] U.S. Cl. ............................................. 180/446; 180/404
[58] Field of Search ........................... 180/443, 404, 180/446; 364/424.051, 424.052, 424.053

[56] References Cited

FOREIGN PATENT DOCUMENTS

0536590 A2   4/1993   Japan .
0631922 A2   1/1995   Japan .
0636528 A1   2/1995   Japan .

Primary Examiner—Brian L. Johnson
Assistant Examiner—Gary Savitt
Attorney, Agent, or Firm—Helfgott & Karas, P.C.

[57] ABSTRACT

In an electric power steering apparatus, a motor current target value of a steering force assisting motor is determined on the basis of a torque detected by a torque sensor. The drive of the motor is controlled using the motor current target value as a target value of an automatic control, and using the driving current of the motor as a feedback value of the automatic control. When the detected torque is within a predetermined range, the motor is inhibited from being driven in the direction opposite to the detected torque. The electric power steering apparatus has a motor non-drive detecting circuit for detecting that the motor current target value is zero, and a drive inhibition holding circuit for holding the motor drive inhibition state, wherein the motor is inhibited from being driven in the direction opposite to the detected torque, until the motor non-drive detecting circuit detects that the motor current target value is zero. Even when a CPU runs away and the motor current target value becomes excessive, self-rotation of a steering wheel and reverse assist caused by the flow of excess motor current are prevented. Even when a CPU runs away exists and assist and assist inhibition are repeated, steering is prevented from becoming unstable.

19 Claims, 8 Drawing Sheets

TORQUE SENSING POWER STEERING DEVICE WITH ABNORMALITY DETECTION, DEAD ZONE DETECTION AND POWER ASSIST MOTOR INHIBITION

BACKGROUND OF THE INVENTION

1. Field of the Invention

The invention relates to an improvement of an electric power steering apparatus in which a steering force assisting motor is controlled to be driven on the basis of a torque detected by a torque sensor, and, when the detected torque is within a predetermined range, the steering force assisting motor is inhibited from being driven in the direction opposite to the detected torque.

2. Description of Related Art

FIG. 1 is a block diagram schematically showing the configuration of a prior art electric power steering apparatus. In the electric power steering apparatus, a CPU 2 determines a motor current target value of a steering force assisting motor 4 on the basis of a torque detected by a torque sensor 1, and controls a motor drive circuit 3 using the motor current target value as a target value of an automatic control, thereby driving the motor 4. The driving current of the motor 4 which is detected by a motor current detecting circuit 5 is supplied to the CPU 2 as the feedback value of the automatic control.

The torque detected by the torque sensor 1 is supplied also to a direction inhibition region judging circuit 8. As shown in FIG. 2, a motor drive inhibition region where, when the detected torque is greater than a predetermined value in either of the right and left directions, the motor 4 is inhibited from being driven in the direction opposite to the detected torque is previously set in the direction inhibition region judging circuit 8. In the motor drive inhibition region, a motor drive inhibiting circuit 14 inhibits the motor 4 from being driven in the direction opposite to the detected torque, so that, when the CPU 2 runs away, the steering wheel is prevented from being subjected to self-rotation or reverse assist (assist of the steering force in the opposite direction).

When the CPU 2 runs away, however, inhibition/permission of the motor driving is determined depending on the value of the detected torque, thereby causing problems as discussed below.

The motor drive inhibiting circuit 14 permits only an excess assist in the same direction as the detected torque. When the steering wheel is operated and the steering force exceeds the dead zone, the assist is performed. In this case, when the steering force is small, the assist reduces the detected torque. This reduction of the detected torque causes the steering force to enter the dead zone, and hence the assist is turned off. Since the assist is turned off, the steering force is increased. When the steering force is increased to exceed the dead zone, the assist is performed. The above process is repeated with the result that the steering becomes unstable. In the dead zone, it is impossible to perform the return control on the steering wheel.

SUMMARY OF THE INVENTION

It is an object of the invention to provide an electric power steering apparatus in which the phenomenon that, when a CPU runs away, the assist and the assist inhibition are repeated and the steering becomes unstable is prevented from occurring.

It is another object of the invention to provide an electric power steering apparatus which, even when a CPU runs away, can stably perform steering.

It is a further object of the invention to provide an electric power steering apparatus which can perform return control of a steering wheel in the dead zone.

It is a still further object of the invention to provide an electric power steering apparatus which is little affected by noise and stably performs steering.

It is a still further object of the invention to provide an electric power steering apparatus which, when a CPU runs away, can inform the driver of the conditions.

It is a still further object of the invention to provide an electric power steering apparatus which can detect a runs away of a CPU in a short time.

The electric power steering apparatus of the invention is an apparatus in which a current target value of a steering force assisting motor is determined on the basis of a torque detected by a torque sensor. The drive of the motor is controlled using the motor current target value as a target value of an automatic control, and using the driving current of the motor as a feedback value of the automatic control. When the detected torque is within a predetermined range, the motor is inhibited from being driven in the direction opposite to the detected torque. The electric power steering apparatus comprises non-drive detecting means for detecting that the motor current target value is zero, and drive inhibition holding means for holding the motor drive inhibition state where the motor is inhibited from being driven in the direction opposite to the detected torque, until the non-drive detecting means detects that the motor current target value is zero.

The drive inhibition holding means holds the motor drive inhibition state where the motor is inhibited from being driven in the direction opposite to the detected torque, until the non-drive detecting means detects that the motor current target value is zero. Even when a CPU runs away and the motor current target value becomes excessive, self-rotation and reverse assist of a steering wheel caused by the flow of an excess motor current are prevented. Furthermore, even when the CPU runs away and the assist and the assist inhibition are repeated, steering is prevented from becoming unstable.

In the electric power steering apparatus, when a first state is detected where the detected torque is outside the dead zone (the zone where the motor current target value is to be zero) and the direction in which the motor is to be driven in accordance with the current target value is opposite to that of the detected torque, the motor is inhibited from being driven.

In the electric power steering apparatus, when a second state is detected where the detected torque is inside the dead zone and the motor driving current is greater than a predetermined value, the motor is inhibited from being driven. In this case, it is possible to perform return control of the steering wheel.

In the electric power steering apparatus, when a third state is detected where the detected torque is outside the dead zone, the direction in which the motor is to be driven in accordance with the current target value is opposite to that of the detected torque and the direction in which the motor is to be driven in accordance with the current target value is opposite to the change direction of the detected torque, the motor is inhibited from being driven.

In the electric power steering apparatus, when a fourth state is detected where the detected torque is inside the dead zone, the motor driving current is greater than a predetermined value, and the direction in which the motor is to be driven by the motor driving current is opposite to the change direction of the detected torque, the motor is inhibited from being driven. In this case, it is possible to perform return control of the steering wheel.

In the electric power steering apparatus, when the first, second, third, or fourth state is detected, a detection timer starts a timer operation for a first predetermined time, and, when the first, second, third, or fourth state is no longer detected, the timer operation is reset. When the detection timer completes the timer operation for the first predetermined time but the first, second, third, or fourth state continues to be detected, the motor is inhibited from being driven. In this case, it is possible to monitor a runaway of the CPU without disturbing a differential control of the torque signal.

In the electric power steering apparatus, when the first, second, third, or fourth state is detected, a definition timer starts a timer operation for a second predetermined time, and, when the first, second, third, or fourth state is no longer detected, the timer operation is reset. When the definition timer completes the timer operation for the second predetermined time while the first, second, third, or fourth state continues to be detected, a fail safe relay, which connects the motor drive circuit with a power source, is turned off so that steering force assist is stopped.

In the electric power steering apparatus, an indication lamp is lit during a period when the drive inhibition holding means holds the motor drive inhibition state, or during a period between the instant when the timer operation of the detection timer for the first predetermined period or that of the definition timer for the second predetermined period is completed and the instant when the first, second, third, or fourth state is detected. When the CPU runs away, therefore, the driver is informed of the conditions.

A judgment whether or not the direction in which the motor is to be driven in accordance with the current target value is opposite to the change direction of the detected torque, may be used as a factor in judging abnormality. In this case, it is possible to detect a runaway of the CPU in a short time, and a safety countermeasure against a runaway of the CPU can be taken promptly.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings showing its embodiments.

Figure 1:
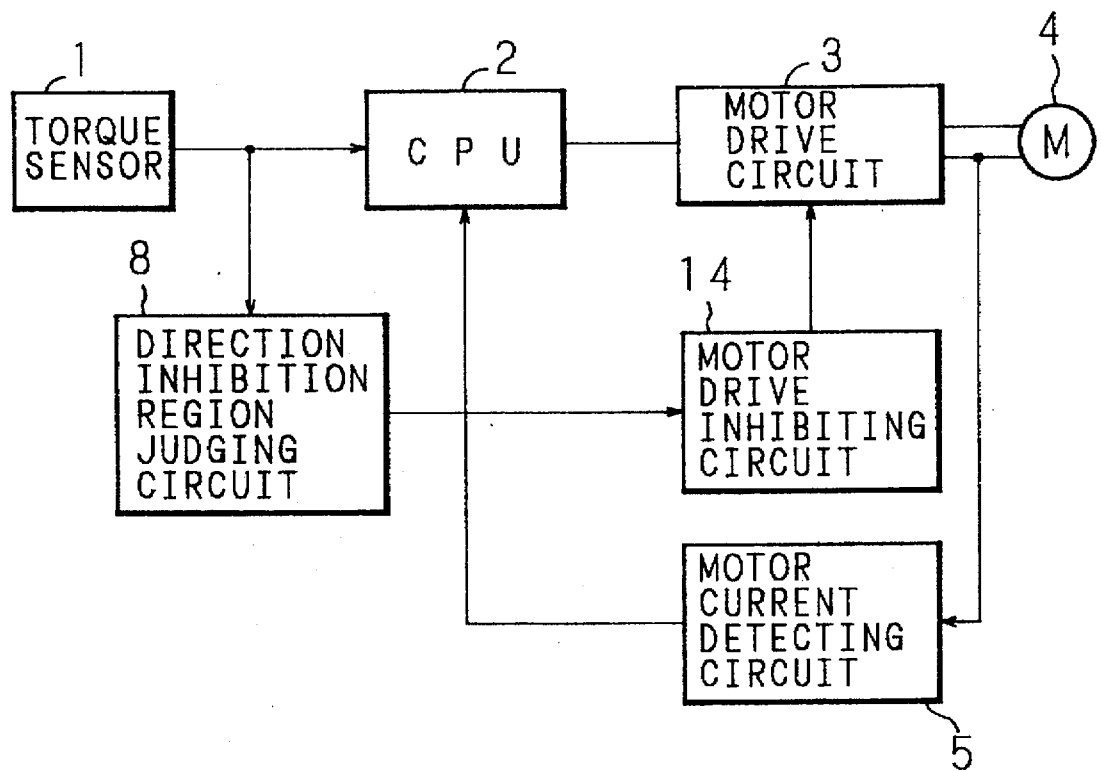
FIG. 1 is a block diagram schematically showing the configuration of a prior art electric power steering apparatus.
Figure 2:
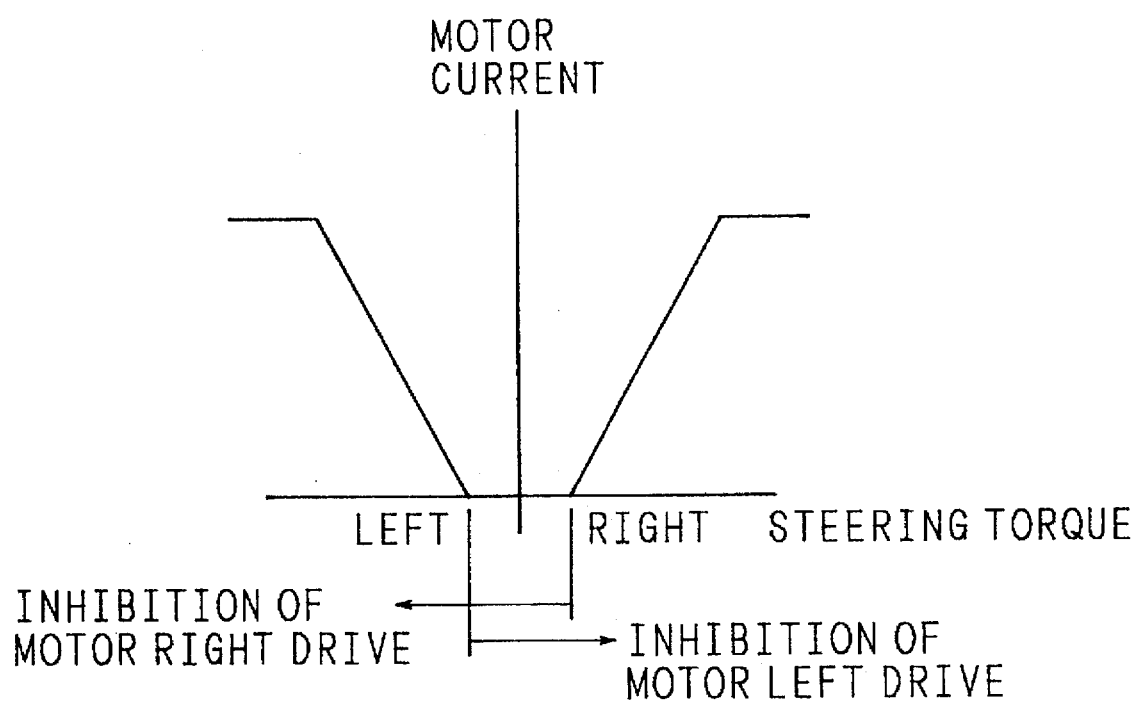
FIG. 2 is a graph showing relationships between the detected torque and the motor current target value of the prior art electric power steering apparatus.
Figure 3:
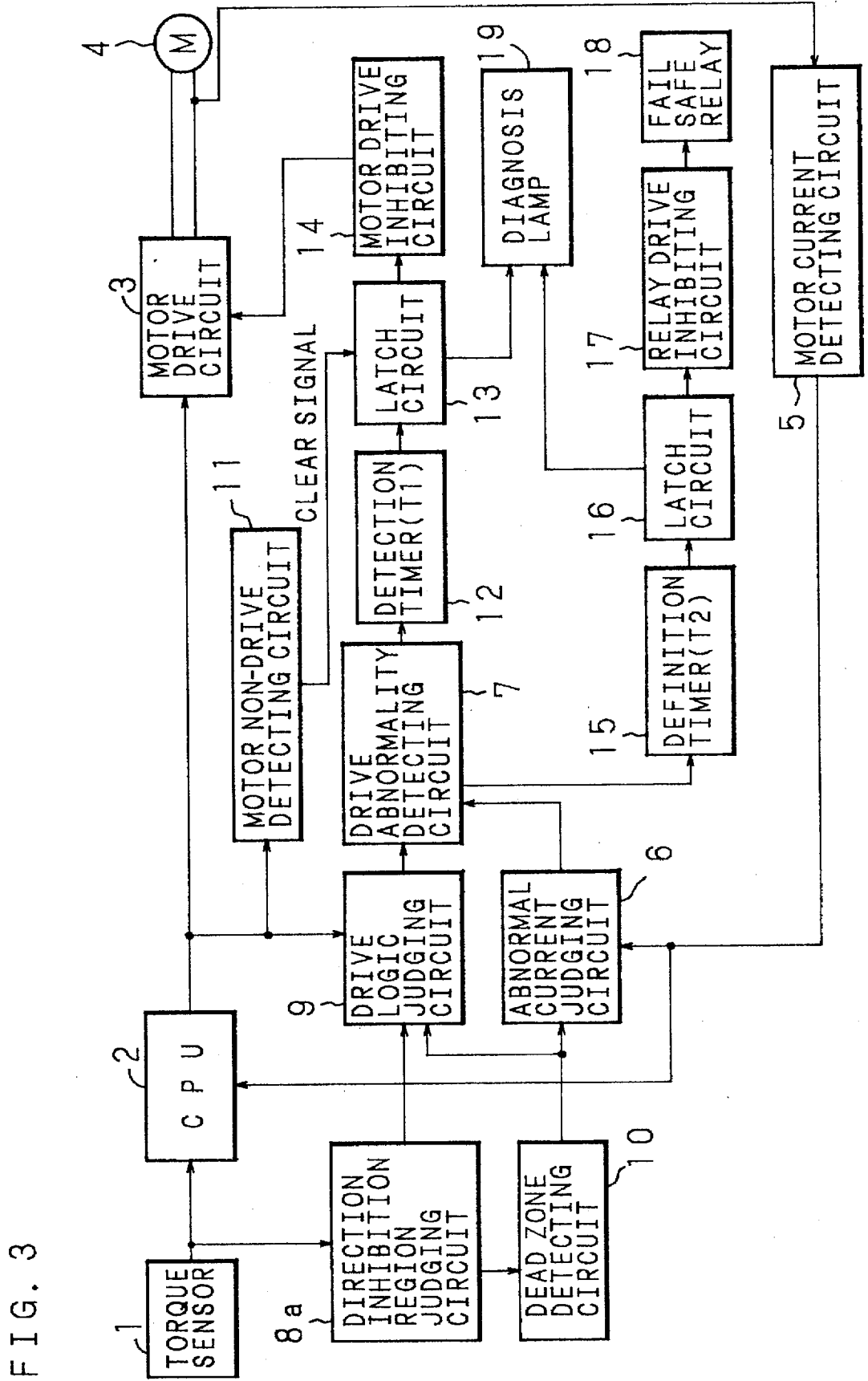
FIG. 3 is a block diagram schematically showing the configuration of an electric power steering apparatus (first embodiment) of the invention.

FIG. 3 is a block diagram showing the configuration of a first embodiment of the electric power steering apparatus of the invention. In the electric power steering apparatus, a CPU 2 determines a current target value of a steering force assisting motor 4 on the basis of a torque detected by a torque sensor 1, and controls a motor drive circuit 3 using the motor current target value as a target value of an automatic control, thereby driving the motor 4. The driving current of the motor 4 detected by the motor current detecting circuit 5 is supplied to the CPU 2 as a feedback value of the automatic control.

Figure 4:
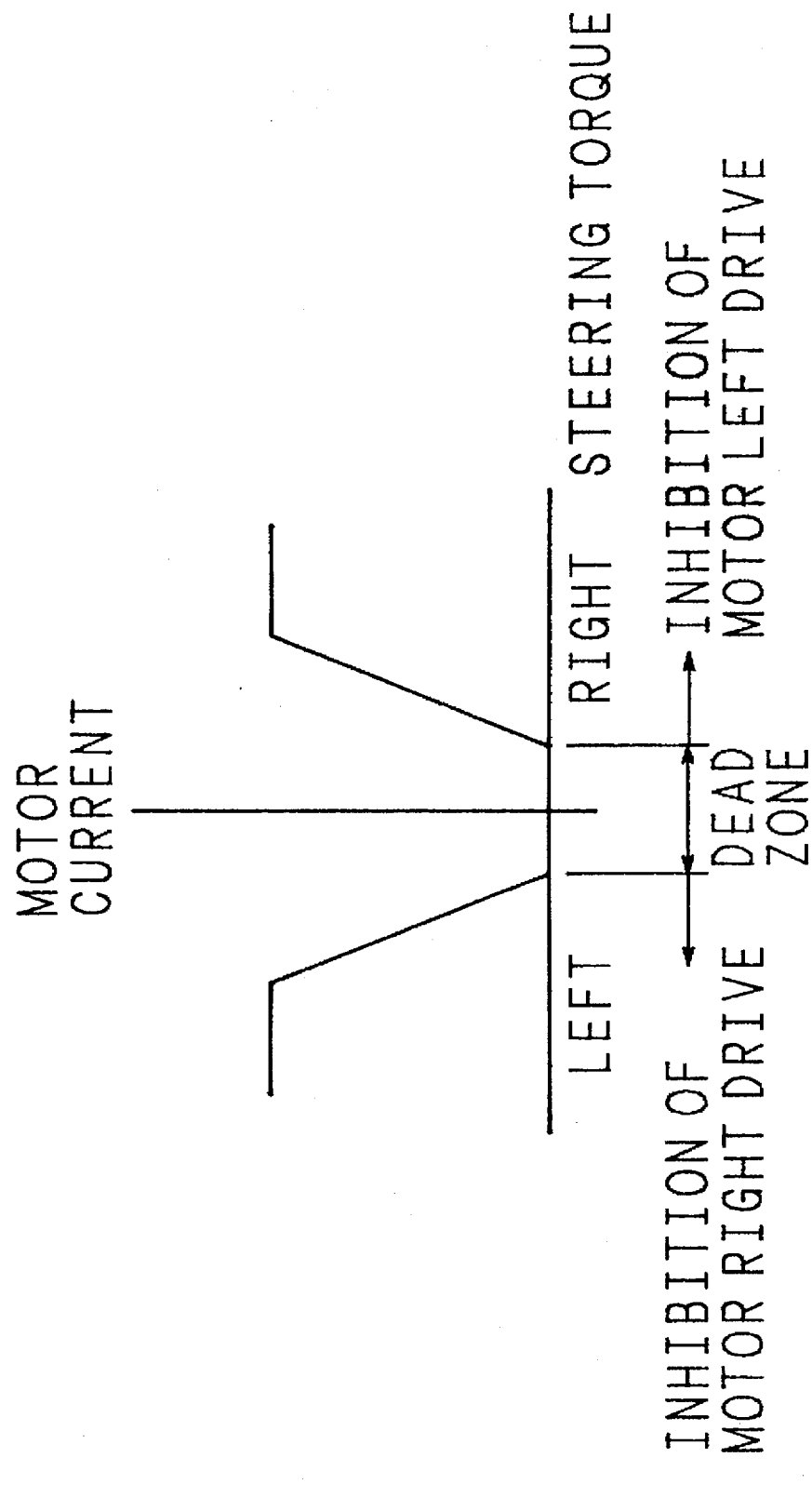
FIG. 4 is a graph showing relationships between the detected torque and the motor current target value of the electric power steering apparatus (first embodiment) of the invention.

The torque detected by the torque sensor 1 is supplied also to a direction inhibition region judging circuit 8a. As shown in FIG. 4, a motor drive inhibition region is previously set in the direction inhibition region judging circuit 8a. In the inhibition region, when the detected torque is greater than a predetermined value in either of the right and left directions, the motor 4 is inhibited from being driven in the direction opposite to the detected torque. A drive logic judging circuit 9 and a dead zone detecting circuit 10 are informed of the state of the detected torque, i.e., whether it is in the motor drive inhibition region or not. A detection signal from the dead zone detecting circuit 10 is supplied to the drive logic judging circuit 9 and an abnormal current judging circuit 6. The CPU 2 sends the motor current target value (magnitude and direction) to the motor drive circuit 3, the drive logic judging circuit 9, and a motor non-drive detecting circuit 11.

The drive logic judging circuit 9 judges whether or not the detected torque is outside the dead zone and whether or not the direction in which the motor 4 is to be driven in accordance with the motor current target value is opposite to the change direction of the detected torque. The abnormal current judging circuit 6 judges whether or not the detected torque is inside the dead zone and whether or not the motor driving current is greater than a predetermined value. The judgment results of the circuits 9 and 6 are supplied to a drive abnormality detecting circuit 7. The predetermined value of the driving current of the motor 4 is set to be a value which is greater than the maximum value of the return current of the steering wheel and which does not cause the electric power steering apparatus to become unstable. When the drive abnormality detecting circuit 7 detects an abnormality from the judgment results, a detection timer 12 and a definition timer 15 start timer operations for predetermined times T1 and T2, respectively.

When the detection timer 12 completes the timer operation for the predetermined time T1, a latch circuit 13 holds an abnormality detection signal from the drive abnormality detecting circuit 7. During a period when the latch circuit 13 holds the abnormality detection signal from the drive abnormality detecting circuit 7, a diagnosis lamp 19 is lit and the motor drive inhibiting circuit 14 stops operation of the motor drive circuit 3. When the motor non-drive detecting circuit 11, for detecting that the motor current target value is zero, detects that the value is zero, the latch circuit 13 is cleared.

When the definition timer 15 completes the timer operation for the predetermined time T2, a latch circuit 16 holds the abnormality detection signal from the drive abnormality detecting circuit 7. During a period when the latch circuit 16 holds the abnormality detection signal from the drive abnormality detecting circuit 7, the diagnosis lamp 19 is lit and a relay drive inhibiting circuit 17 causes a fail safe relay 18, which connects the motor drive circuit 3 with a power source, to be turned off.

The operation of the thus configured electric power steering apparatus will be described.

The torque detected by the torque sensor 1 is supplied to the direction inhibition region judging circuit 8a. The direction inhibition region judging circuit 8a judges the direction and magnitude of the detected torque. A signal indicative of the direction of the detected torque is sent to the drive logic judging circuit 9. Regarding the magnitude of the detected torque, a signal indicative of the magnitude of the detected torque in relationship with a predetermined value (inside the dead zone or outside the dead zone) in each of the right and left directions as shown in FIG. 4, is sent to the dead zone detecting circuit 10. The dead zone detecting circuit 10 supplies a notification signal, which indicates whether the detected torque is inside or outside the dead zone, to the drive logic judging circuit 9 and the abnormal current judging circuit 6.

During a period when the detected torque is outside the dead zone, and the direction in which the motor 4 is to be driven in accordance with the motor current target value is opposite to the direction of the detected torque, the drive logic judging circuit 9 notifies the drive abnormality detecting circuit 7 of the abnormality. During a period when the detected torque is inside the dead zone and the motor driving current is greater than a predetermined value, the abnormal current judging circuit 6 notifies the drive abnormality detecting circuit 7 of the abnormality. When notified of the abnormality by the drive logic judging circuit 9 or the abnormal current judging circuit 6, the drive abnormality detecting circuit 7 activates the detection timer 12 and the definition timer 15. When the abnormality notification from the drive logic judging circuit 9 or the abnormal current judging circuit 6 is interrupted, the drive abnormality detecting circuit 7 resets the detection timer 12 and the definition timer 15.

When the detection timer 12 completes the timer operation for the predetermined time T1 while the abnormality notification from the drive logic judging circuit 9 or the abnormal current judging circuit 6 to the drive abnormality detecting circuit 7 continues without interruption, the latch circuit 13 holds the abnormality notification from the drive logic judging circuit 9 or the abnormal current judging circuit 6. During a period when the latch circuit 13 holds the abnormality notification, the diagnosis lamp 19 is lit and the motor drive inhibiting circuit 14 is operated so that the motor 4 is inhibited from being driven. During this period, when the motor non-drive detecting circuit 11 detects that the motor current target value is zero, the latch circuit 13 is cleared and operation of the motor drive inhibiting circuit 14 is stopped so that the inhibition of the drive of the motor 4 is canceled.

The CPU 2 determines the assist current and the steering wheel return current on the basis of the torque signal, and performs the angular velocity difference control (differential control of the torque signal). Therefore, a state occurs instantaneously where the driving current of the motor 4 is large although the direction in which the motor 4 is to be driven in accordance with the motor current target value is opposite to the direction of the detected torque or the detected torque is inside the dead zone. This may result in, even though the CPU 2 is normal (is not running away), a drive abnormality being detected. Consequently, the predetermined time T1 of the detection timer 12 must be set longer than a period when the drive abnormality detecting circuit 7 operates in a normal state. Furthermore, the predetermined time T1 of the detection timer 12 must be set within a period during which safety can be ensured in the case of a runaway of the CPU 2. Consequently, the detection timer 12 must operate so that, when the CPU 2 is normal, a runaway of the CPU 2 is not erroneously detected and, when the CPU 2 runs away, the motor 4 is turned off, thereby ensuring safety.

The apparatus must be configured so that the latch circuit 13 is not cleared unless the motor non-drive detecting circuit 11 first detects that the motor current target value is zero (non-driven). Otherwise, a problem arises as discussed below. In the situation where the CPU 2 runs away and the motor current target value becomes excessive, even when the detected torque is inside the dead zone, a large current flows through the motor 4 during the period when the detection timer 12 performs the timer operation for the predetermined time T1, whereby the steering wheel is caused to self-rotate. The self-rotation of the steering wheel produces a detected torque having a direction which is opposite to the driving direction of the motor 4, which is driven by the driving current. Therefore, the drive logic judging circuit 9 judges an abnormality and reports an abnormality. Accordingly, the motor 4 is inhibited from being driven and an assist-off state is established, thereby causing the steering wheel to return in the opposite direction. At this time, the judgment of the drive logic judging circuit 9 indicates normal, and hence a large current flows again. The above process is repeated with the result that the operation of the electric power steering apparatus becomes unstable.

When the definition timer 15 completes the timer operation for the predetermined time T2 while the abnormality notification from the drive logic judging circuit 9 or the abnormal current judging circuit 6 to the drive abnormality detecting circuit 7 continues without interruption, the latch circuit 16 holds the abnormality notification (report) from the drive logic judging circuit 9 or the abnormal current judging circuit 6. During a period when the latch circuit 16 holds the abnormality notification, the diagnosis lamp 19 is lit and the relay drive inhibiting circuit 17 is operated so that the fail safe relay 18 is turned off and the power source of the motor drive circuit 3 is turned off. When the power source of the electric power steering apparatus is turned off (when the ignition key is turned off), the latch circuit 16 is cleared.

When the CPU 2 detects the non-drive state of the motor, the detection timer 12 is reset. Depending on the runaway state of the CPU 2, therefore, the detection and the reset are repeated so that an unstable state may be caused. To avoid, the predetermined time T2 of the definition timer 15 is set sufficiently longer than the predetermined time T1 of the detection timer 12, and, when a drive abnormality continues for the predetermined time T2, the fault is determined.

When the logic holds that the detected torque is not outside the dead zone and the direction in which the motor 4 is to be driven in accordance with the motor current target value is opposite to the direction of the detected torque, the drive logic judging circuit 9 judges that the apparatus is normal, and does not notify the drive abnormality detecting circuit 7 of an abnormality. During a period when the conditions are not satisfied that the detected torque is inside the dead zone and the driving current of the motor 4 is greater than the predetermined value, the abnormal current judging circuit 6 does not notify the drive abnormality detecting circuit 7 of an abnormality. When the drive logic judging circuit 9 or the abnormal current judging circuit 6 does not notify of an abnormality, the drive abnormality detecting circuit 7 stops the detection timer 12 and the definition timer 15. Therefore, the latch circuits 13 and 16 do not hold an abnormality notification, and as a result the motor drive inhibiting circuit 14 and the relay drive inhibiting circuit 17 are not activated.

Figure 5:
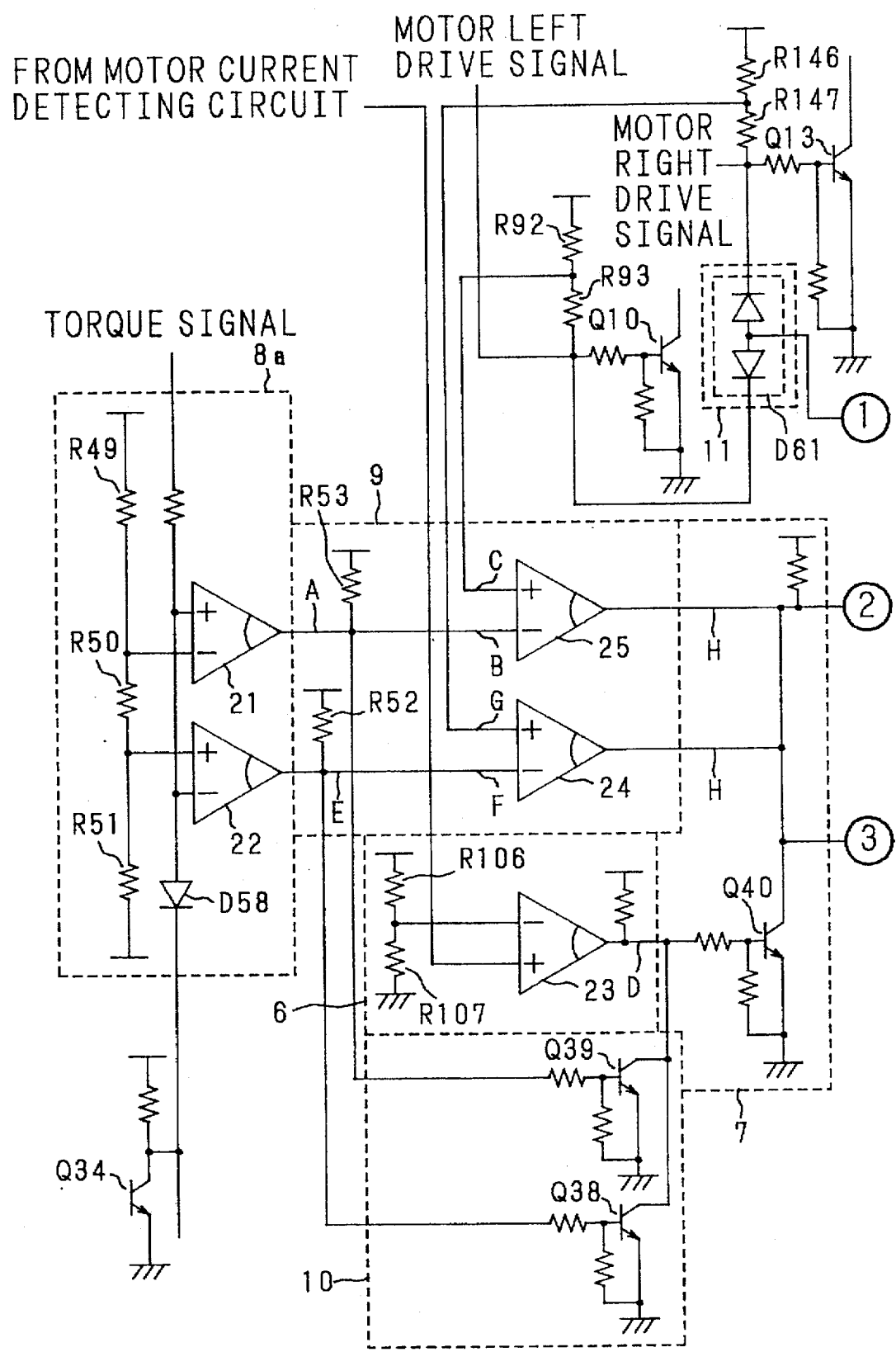
FIG. 5 is a circuit diagram showing the specific configuration of the electric power steering apparatus (first embodiment) of the invention.
Figure 6:
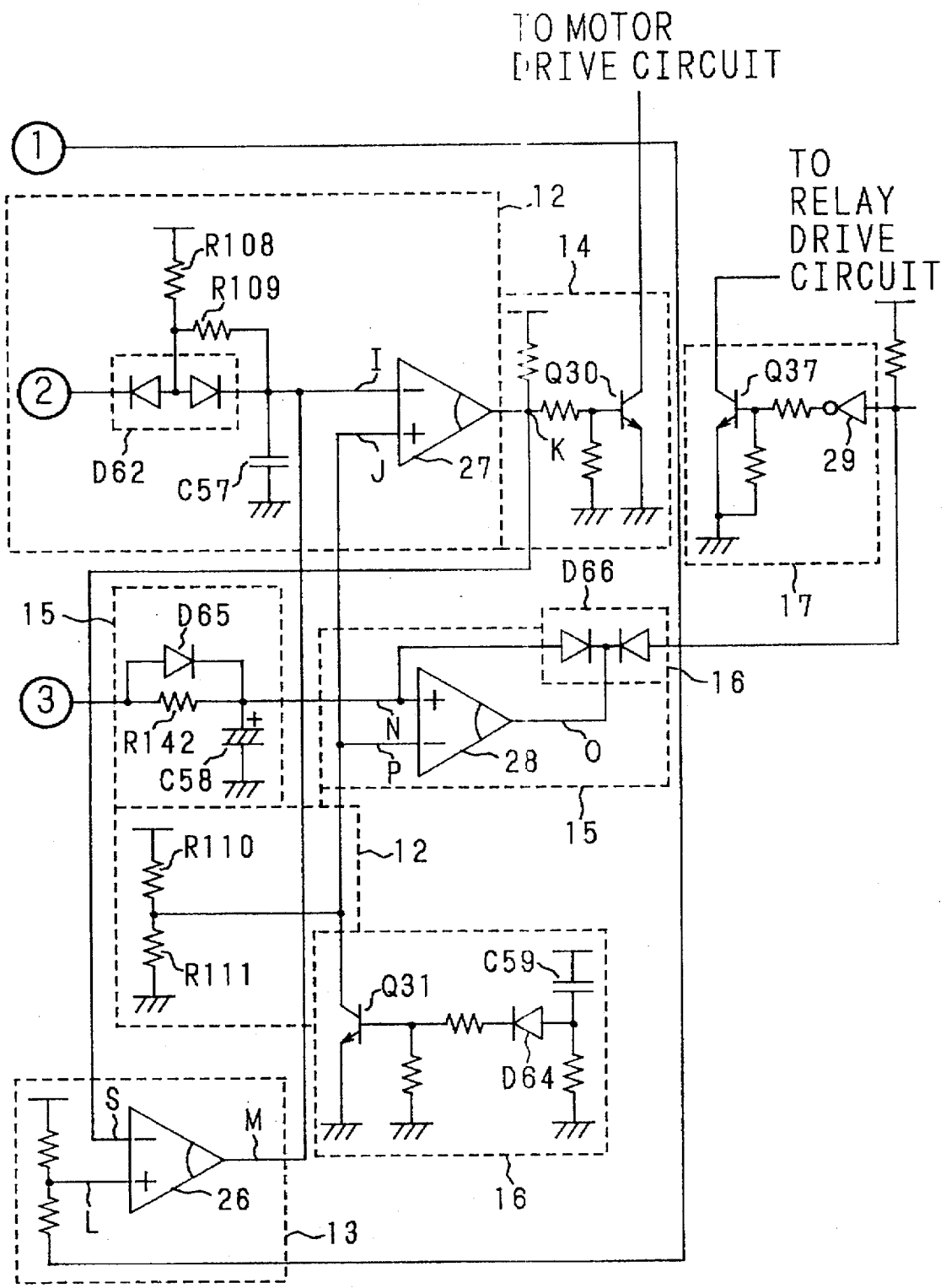
FIG. 6 is a circuit diagram showing the specific configuration of the electric power steering apparatus (first embodiment) of the invention.

FIG. 5 is a circuit diagram showing the configuration of the direction inhibition region judging circuit 8a, the drive logic judging circuit 9, the dead zone detecting circuit 10, the abnormal current judging circuit 6, the drive abnormality detecting circuit 7, and the motor non-drive detecting circuit 11. FIG. 6 is a circuit diagram showing the configuration of the detection timer 12, the latch circuit 13, the motor drive inhibiting circuit 14, the definition timer 15, the latch circuit 16, and the relay drive inhibiting circuit 17.

The direction inhibition region judging circuit 8a is a window comparator comprising: an operational amplifier 21 in which a given voltage is applied to the inverting input terminal and the torque signal is applied to the non-inverting input terminal; an operational amplifier 22 in which a given voltage is applied to the non-inverting input terminal and the torque signal is applied to the inverting input terminal; and potential dividing resistors R49, R50, and R51 which are used for producing the given voltages. The torque signal line is connected to the collector of an NPN transistor Q34 of a clutch monitor circuit, through a diode D58 having a diode which is connected to the inverting input terminal of the operational amplifier 22.

The drive logic judging circuit 9 comprises an operational amplifier 25 in which an output of the operational amplifier 21 is supplied to the inverting input terminal and a sense signal from a motor left driving signal sensing circuit is applied to the non-inverting input terminal, and an operational amplifier 24 in which a sense signal from a motor right driving signal sensing circuit is applied to the non-inverting input terminal and an output of the operational amplifier 22 is supplied to the inverting input terminal. The motor left driving signal sensing circuit comprises an NPN transistor Q10 in which a motor left drive signal is applied to the base and the base is pulled up through resistors R92 and R93. The motor right driving signal sensing circuit comprises an NPN transistor Q13 in which a motor right drive signal is applied to the base and the base is pulled up through resistors R146 and R147. The motor non-drive detecting circuit 11 consists of a diode pair D61 in which the anodes are connected to each other and the cathodes are respectively connected to the bases of the transistors Q10 and Q13. The output of the circuit is taken out from the anodes.

The dead zone detecting circuit 10 comprises an NPN transistor Q39 in which the output of the operational amplifier 21 is supplied to the base, the base is pulled up through a resistor R53, and the collector is connected to an output terminal of an operational amplifier 23 of the abnormal current judging circuit 6, and an NPN transistor Q38 in which the output of the operational amplifier 22 is supplied to the base, the base is pulled up through a resistor R52, and the collector is connected to the output terminal of the operational amplifier 23. The abnormal current judging circuit 6 comprises the operational amplifier 23 in which a given voltage is applied to the inverting input terminal and the detection signal from the motor current detecting circuit 5 is applied to the non-inverting input terminal, and potential dividing resistors R106 and R107 which are used for producing the given voltages. The drive abnormality detecting circuit 7 comprises an NPN transistor Q40 in which the output of the operational amplifier 23 is supplied to the base through a resistor, and the collector is connected to the output terminals of the operational amplifiers 24 and 25 and pulled up through a resistor.

The detection timer 12 comprises: an operational amplifier 27 in which the inverting input terminal is pulled up through resistors R108 and R109 and grounded through a capacitor C57, and a given voltage obtained from potential dividing resistors R110 and R111 is applied to the non-inverting input terminal; and a diode pair D62 in which the anodes are connected to the resistors R108 and R109, the cathode of one diode is connected to the output terminals of the operational amplifiers 24 and 25, and the cathode of the other diode is connected to the non-inverting input terminal of the operational amplifier 27. The latch circuit 13 comprises an operational amplifier 26 in which the output of the operational amplifier 27 is supplied to the non-inverting input terminal, and a division voltage produced by potential dividing resistors from the difference voltage of the power source voltage and the anode voltage of the diode pair D61 of the motor non-drive detecting circuit 11 is applied to the inverting input terminal.

The motor drive inhibiting circuit 14 comprises an NPN transistor Q30 in which the output of the operational amplifier 27 is supplied to the base through a resistor, the base is pulled up through resistors, and the collector is connected to the motor drive circuit 3. The definition timer 15 comprises an operational amplifier 28 in which the non-inverting input terminal is grounded through a capacitor C58, and the given voltage obtained from the potential dividing resistors R110 and R111 is applied to the inverting input terminal, and a diode D65 in which the anode is connected to the output terminals of the operational amplifiers 24 and 25, the cathode is connected to the non-inverting input terminal of the operational amplifier 28, and a resistor R142 is connected in parallel.

The latch circuit 16 comprises an NPN transistor Q31 in which the cathode of a diode D64 is connected to the base through a resistor, and the given voltage obtained from the potential dividing resistors R110 and R111 is applied to the collector, and a diode pair D66 in which the cathodes are commonly connected to the output terminal of the operational amplifier 28, and the anode of one diode is connected to the inverting input terminal of the operational amplifier 28. The anode of the diode D64 is connected to a junction of a capacitor C59 the other electrode of which is connected to the power source, and a resistor the other terminal of which is grounded. The relay drive inhibiting circuit 17 comprises an NPN transistor Q37 in which the base is connected to the anode of the other diode of the diode pair D66 through a resistor and an inverter 29, and the connector is connected to a relay drive circuit.

The operation of the thus configured circuit will be described.

When the detected torque is in the right (directed) torque region and the CPU 2 operates normally, the voltage of the output terminal A of the operational amplifier 21 is high, and, assuming that the power source is 5 V, the inverting input terminal B of the operational amplifier 25 is set to be 2.5 to 3.5 V by the function of the resistor R53 and the NPN transistor Q39. When the motor left drive signal indicates the non-drive (high voltage), the non-inverting input terminal C of the operational amplifier 25 is 5 V. Since the NPN transistor Q39 is on, the voltage of the output terminal D of the operational amplifier 23 is low so that the NPN transistor Q40 is turned off.

The voltage of the output terminal E of the operational amplifier 22 (the inverting input terminal F of the operational amplifier 24) is low. When the motor right drive signal indicates the non-drive (high voltage), the non-inverting input terminal G of the operational amplifier 24 is 5 V. When the motor right drive signal indicates the drive (low voltage), the non-inverting input terminal G of the operational amplifier 24 is set to be 1.6 V by the voltage division of the resistors R146 and R147. When the detected torque is in the right (directed) torque region and the CPU 2 operates normally, the voltage of the output terminals H of the operational amplifiers 24 and 25 (the output of the drive logic judging circuit 9) is high.

When the detected torque is in the right (directed) torque region and the CPU 2 operates abnormally, the voltage of the output terminal A of the operational amplifier 21 is high, and the inverting input terminal B of the operational amplifier 25 is set to be 2.5 to 3.5 V by the function of the resistor R53 and the NPN transistor Q39. When the motor left drive signal indicates the drive (low voltage), the non-inverting input terminal C of the operational amplifier 25 is set to be 1.6 V by the voltage division of the resistors R92 and R93. When the detected torque is in the right (directed) torque region and the CPU 2 operates abnormally, the voltage of the output terminals H of the operational amplifiers 24 and 25 (the output of the drive logic judging circuit 9) is low regardless of the conditions other than those described above.

When the detected torque is inside the dead zone, the voltages of the output terminal A of the operational amplifier 21 and the output terminal E of the operational amplifier 22 (the output of the direction inhibition region judging circuit 8a) are low, and hence the voltage of the output terminals H of the operational amplifiers 24 and 25 (the output of the drive logic judging circuit 9) is high regardless of the motor left drive signal and the motor left drive signal, with the result that an abnormality of the drive logic is not detected. When the motor driving current detected by the motor current detecting circuit 5 is smaller than a value (e.g., 10 A) determined by the resistors R106 and R107, the voltage of the output terminal D of the operational amplifier 23 is low and the NPN transistor Q40 is turned off. Consequently, the voltage of the output terminals H of the operational amplifiers 24 and 25 (the output of the drive logic judging circuit 9) is high, and an abnormality of the drive logic is not detected. When the motor driving current detected by the motor current detecting circuit 5 is larger than the value (e.g., 10 A) determined by the resistors R106 and R107, the voltage of the output terminal D of the operational amplifier 23 is high and the NPN transistor Q40 is turned on. Consequently, the voltage of the output terminals H of the operational amplifiers 24 and 25 (the output of the drive logic judging circuit 9) is low regardless of the other conditions, and an abnormality of the drive logic is detected.

When the clutch is off, the NPN transistor Q34 of the clutch monitor circuit is turned on so that the torque signal supplied to the window comparator consisting of the operational amplifiers 21 and 22 is low. Consequently, the left drive of the motor is forcedly allowed and the motor lock check is enabled.

When the abnormality of the drive logic is detected and the voltage of the output terminals H of the operational amplifiers 24 and 25 (the output of the drive logic judging circuit 9) is low, charges stored in the capacitor C57 of the detection timer 12 are discharged through the resistor R109 (determination of the detection time). When the voltage of the inverting input terminal I of the operational amplifier 27 is lower than that of the non-inverting input terminal J of the operational amplifier 27 which is determined by the resistors R110 and R111, the voltage of the output terminal K of the operational amplifier 27 (the output of the detection timer 12) is high and the NPN transistor Q30 is turned on, whereby the drive of the motor 4 is inhibited through the motor drive circuit 3 connected to the collector of the NPN transistor Q30.

When the voltage of the output terminal K of the operational amplifier 27 (the output of the detection timer 12) is once set to be high, the voltage of the inverting input terminal S of the operational amplifier 26 of the latch circuit 13 (the output terminal K of the operational amplifier 27) is higher than that of the non-inverting input terminal L of the operational amplifier 26 during a period when the motor drive signal is in the drive state (low voltage). Accordingly, the voltage of the output terminal M of the operational amplifier 26 is low. Although the voltage of the output terminals H of the operational amplifiers 24 and 25 (the output of the drive logic judging circuit 9) may be returned to be high, the voltage of the inverting input terminal S of the operational amplifier 26 (the output terminal K of the operational amplifier 27) is held high.

When the abnormality of the drive logic is not detected any longer and the voltage the output terminals H of the operational amplifiers 24 and 25 (the output of the drive logic judging circuit 9) becomes high, the capacitor C57 is charged through the resistor R108 and the diode pair D62. The time constant of the charging process is set to be sufficiently smaller than that of the discharging process.

When the motor drive signal is in the non-drive state (high voltage), the voltage of the non-inverting input terminal L of the operational amplifier 26 of the latch circuit 13 is 5 V, and the voltage of the inverting input terminal S of the operational amplifier 26 (the output terminal K of the operational amplifier 27) is lower than that of the non-inverting input terminal L of the operational amplifier 26. Accordingly, the voltage of the inverting input terminal I of the operational amplifier 27 (the output terminal M of the operational amplifier 26) depends on that of the output terminals H of the operational amplifiers 24 and 25 (the output of the drive logic judging circuit 9). When the voltage of the output terminals H of the operational amplifiers 24 and 25 is high, the inhibition of the drive of the motor 4 is canceled.

When the abnormality of the drive logic is detected and the voltage of the output terminals H of the operational amplifiers 24 and 25 (the output of the drive logic judging circuit 9) is low, charges stored in the capacitor C58 of the definition timer 15 are discharged through the resistor R142 (determination of the definition time). When the voltage of the non-inverting input terminal N of the operational amplifier 28 is lower than that of the inverting input terminal P of the operational amplifier 28, the voltage of the output terminal O of the operational amplifier 28 is low, and the NPN transistor Q37 of the relay drive inhibiting circuit 17 is turned on, whereby the fail safe relay 18 is inhibited from operating (the power source of the motor drive circuit 3 is turned off).

When the voltage of the output terminal O the operational amplifier 28 becomes low, the voltage of the non-inverting input terminal N of the operational amplifier 28 is lowered to a value consisting of only the forward voltage of the diode pair D66, and hence lower than that of the inverting input terminal P of the operational amplifier 28. Consequently, the voltage of the output terminal O the operational amplifier 28 is held low (determination of the fault state).

When the electric power steering apparatus starts to operate (when the ignition key is turned on), a differential signal which is produced by the capacitor C59 when the power source voltage of 5 V rises, causes the NPN transistor Q31 of the latch circuit 16 to be instantaneously turned on, so that the voltage of the inverting input terminal P of the operational amplifier 28 is low. Consequently, the voltage of the output terminal O of the operational amplifier 28 becomes high. During the period of the high voltage, the capacitor C58 of the definition timer 15 is charged.

The first embodiment described above is little affected by noise and can prevent the phenomenon from occurring that, when the CPU 2 runs away, the assist and the assist inhibition are repeated and the steering becomes unstable. The embodiment can perform return control of the steering wheel. Furthermore, the embodiment can monitor a runaway of the CPU without disturbing the differential control of the torque signal. When the CPU 2 runs away, the diagnosis lamp 19 is lit so that the driver is informed of the conditions.

In the electric power steering apparatus of the first embodiment, the CPU 2 determines the assist current and the steering wheel return current on the basis of the torque signal, and performs the differential control (angular velocity difference control) of the detection torque signal. When the gain of the differential control is set to be large, however, there arises the following problem. Even though the direction in which the motor 4 is to be driven in accordance with the motor current target value is opposite to that of the detected torque or the detected torque is inside the dead zone, a phenomenon instantaneously occurs that a large driving current flows through the motor 4. This may cause a drive abnormality to be detected although the CPU 2 is normal (is not running away). To avoid this, the predetermined time T1 of the detection timer 12 must be set to be longer than a period when the drive abnormality detecting circuit 7 operates in a normal state. When the predetermined time T1 is set longer, however, the CPU 2 is allowed to continue to run away for a long time. Consequently, there is a possibility that the above countermeasure fails to function as a safety measure against a runaway, and the embodiment needs improvement.

An electric power steering apparatus, which has been devised in view of the above circumstances, is a second embodiment of the invention which will be described below.

Figure 7:
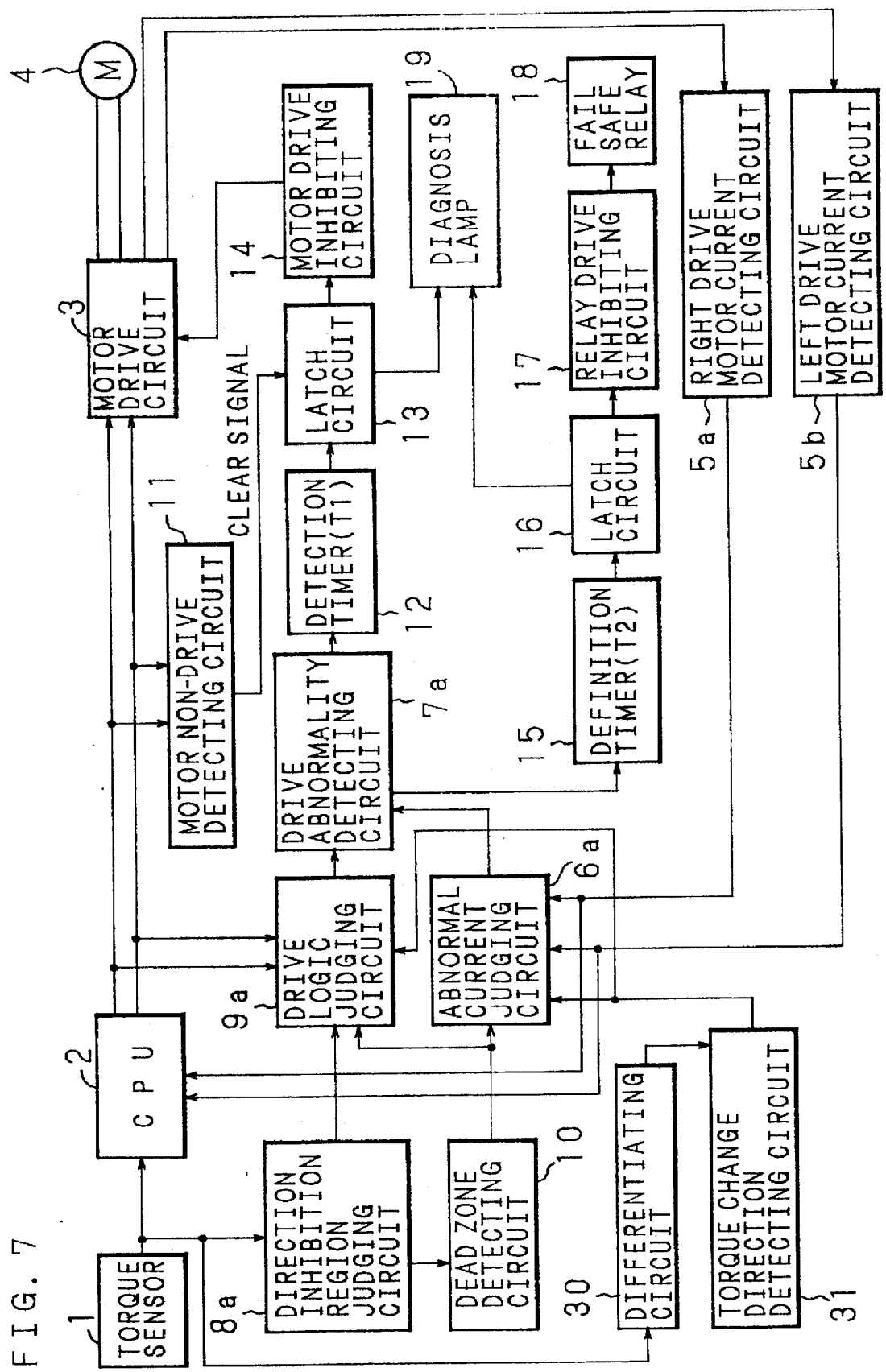
FIG. 7 is a block diagram schematically showing the configuration of an alternative electric power steering apparatus (second embodiment) of the invention.

FIG. 7 is a block diagram showing the configuration of the second embodiment of the electric power steering apparatus of the invention. In the electric power steering apparatus, a detection torque signal indicative of the torque detected by the torque sensor 1 is supplied to the CPU 2. When the CPU 2 receives the detection torque signal, the CPU 2 reads out a target value current corresponding to the detection torque signal from a target value current table (not shown), which is incorporated in the CPU, and differentiates the detection torque signal. The differential value is added to the target value current (PD control), whereby the motor current target value (magnitude and direction) of the steering force assisting motor 4 is determined.

The CPU 2 controls the motor drive circuit 3 using the motor current target value as a target value of an automatic control, thereby driving the motor 4. The driving current of the motor 4, which is detected by a right drive motor current detecting circuit 5a and a left drive motor current detecting circuit 5b, is supplied to the CPU 2 as a feedback value of the automatic control. The CPU 2 also supplies the motor current target value to a drive logic judging circuit 9a and the motor non-drive detecting circuit 11.

Figure 8:
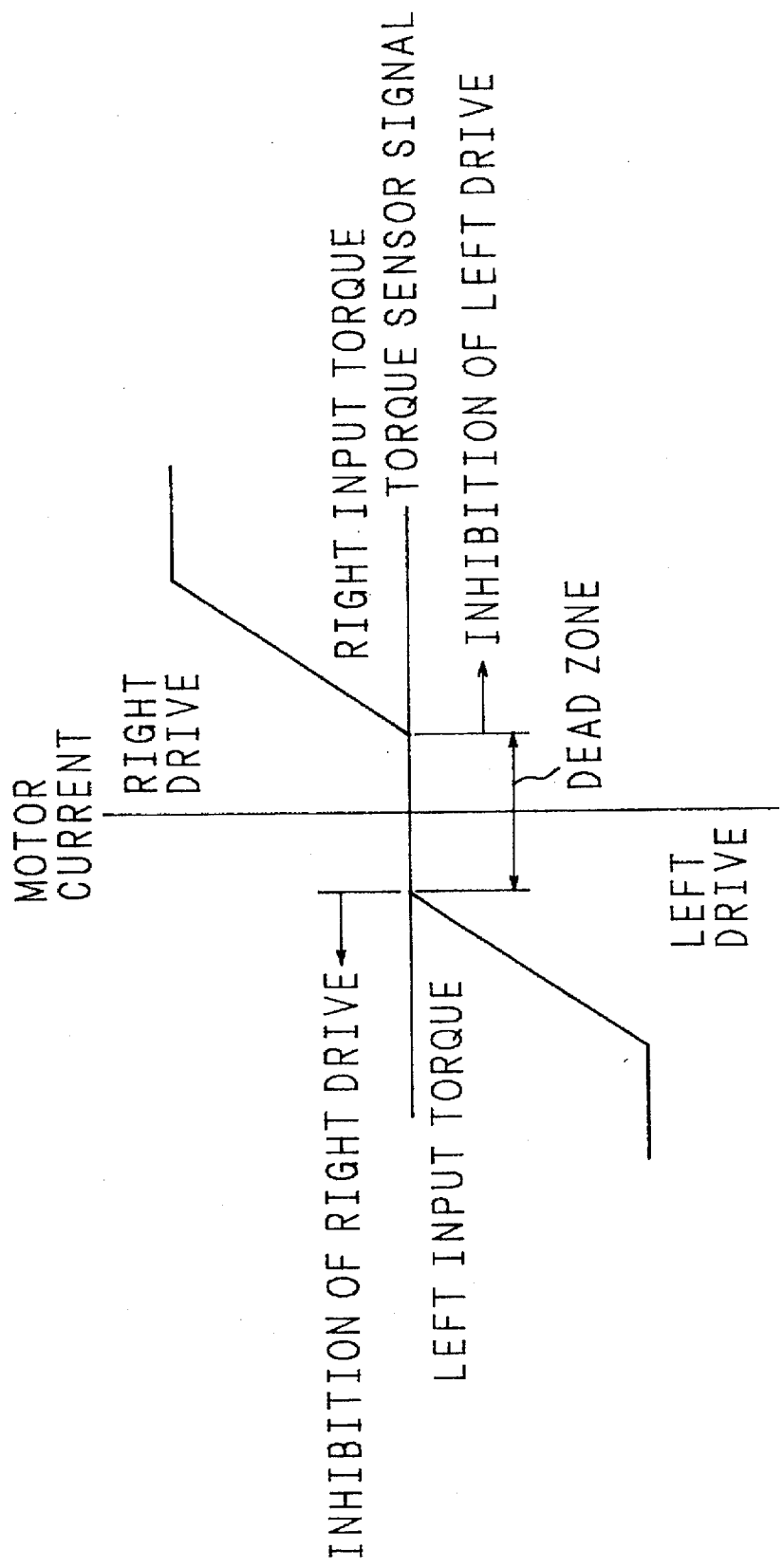
FIG. 8 is a graph showing relationships between the detected torque and the motor current target value of the electric power steering apparatus (second embodiment) of the invention.

The detection torque signal from the torque sensor 1 is also supplied to the direction inhibition region judging circuit 8a. In the direction inhibition region judging circuit 8a, as shown in FIG. 8, a predetermined value is set for each of the right and left directions. The state of the detected torque, i.e., whether it is within the predetermined value or not, is indicated to the drive logic judging circuit 9a and the dead zone detecting circuit 10. The detection torque signal from the torque sensor 1 is also supplied to a differentiating circuit 30. The differential result of the differentiating circuit 30 is supplied to a torque change direction detecting circuit 31, which in turn detects the change direction of the detected torque. A signal indicative of the change direction of the detected torque is supplied to an abnormal current judging circuit 6a and the drive logic judging circuit 9a.

The dead zone detecting circuit 10 detects the dead zone of the detected torque where the motor current target value is to be zero. A detection signal of the dead zone detecting circuit 10 is supplied to the drive logic judging circuit 9a and the abnormal current judging circuit 6a. The drive logic judging circuit 9a judges whether or not the detected torque is outside the dead zone, whether or not the direction in which the motor 4 is to be driven in accordance with the motor current target value is opposite to the direction of the detected torque, and whether or not the direction in which the motor 4 is to be driven in accordance with the motor current target value is opposite to the change direction of the detected torque. The abnormal current judging circuit 6a judges whether or not the detected torque is inside the dead zone, whether or not the driving current of the motor 4 is greater than a predetermined value (e.g., 10 A), and whether or not the direction in which the motor 4 is to be driven in accordance with the driving current of the motor 4 is opposite to the change direction of the detected torque. The predetermined value of the driving current of the motor 4 is a value which is greater than the maximum value of the return current of the steering wheel and which does not cause the electric power steering apparatus to become unstable.

The judgment results of the drive logic judging circuit 9a and the abnormal current judging circuit 6a are supplied to a drive abnormality detecting circuit 7a. When the drive abnormality detecting circuit 7a detects an abnormality from the judgment results, the detection timer 12 and the definition timer 15 start timer operations for predetermined times T1 (e.g., 10 msec.) and T2 (e.g., 1 sec.), respectively.

When the detection timer 12 completes the timer operation for the predetermined time T1, the latch circuit 13 holds an abnormality detection signal from the drive abnormality detecting circuit 7a. During a period when the latch circuit 13 holds the abnormality detection signal from the drive abnormality detecting circuit 7a, the diagnosis lamp 19 is lit and the motor drive inhibiting circuit 14 stops operation of the motor drive circuit 3. When the motor non-drive detecting circuit 11 for detecting that the motor current target value is zero detects that the value is zero, the latch circuit 13 is cleared.

When the definition timer 15 completes the timer operation for the predetermined time T2, the latch circuit 16 holds the abnormality detection signal from the drive abnormality detecting circuit 7a. During a period when the latch circuit 16 holds the abnormality detection signal from the drive abnormality detecting circuit 7a, the diagnosis lamp 19 is lit and the relay drive inhibiting circuit 17 causes the fail safe relay 18, which connects the motor drive circuit 3 with the power source, to be turned off.

The operation of the thus configured electric power steering apparatus will be described.

The torque detected by the torque sensor 1 is supplied to the direction inhibition region judging circuit 8a. The direction inhibition region judging circuit 8a judges the direction and magnitude of the detected torque. A signal indicative of the direction of the detected torque is sent to the drive logic judging circuit 9a. Regarding the magnitude of the detected torque, a signal indicative of the magnitude of the detected torque in relationship with a predetermined value (inside the dead zone or outside the dead zone) in each of the right and left directions as shown in FIG. 8 is sent to the dead zone detecting circuit 10. The dead zone detecting circuit 10 supplies a notification signal which indicates whether the detected torque is inside or outside the dead zone, to the drive logic judging circuit 9a and the abnormal current judging circuit 6a.

The torque detected by the torque sensor 1 is also supplied to the differentiating circuit 30. The calculation result of the differentiating circuit 30 is supplied to the torque change direction detecting circuit 31 and the change direction of the detected torque is detected. A signal indicative of the change direction of the detected torque is supplied to the abnormal current judging circuit 6a and the drive logic judging circuit 9a.

During a period when the detected torque is outside the dead zone, the direction in which the motor is to be driven in accordance with the motor current target value is opposite to the direction of the detected torque, and the direction in which the motor is to be driven in accordance with the motor current target value is opposite to the change direction of the detected torque, the drive logic judging circuit 9a notifies the drive abnormality detecting circuit 7a of the abnormality. During a period when the detected torque is inside the dead zone, the motor driving current is greater than a predetermined value, and the direction in which the motor is to be driven in accordance with the motor driving current is opposite to the change direction of the detected torque, the abnormal current judging circuit 6a notifies the drive abnormality detecting circuit 7a of the abnormality.

When notified of the abnormality by the drive logic judging circuit 9a or the abnormal current judging circuit 6a, the drive abnormality detecting circuit 7a detects the abnormality and activates the detection timer 12 and the definition timer 15, and, when the abnormality notification from the drive logic judging circuit 9a or the abnormal current judging circuit 6a is interrupted, resets the detection timer 12 and the definition timer 15.

When the detection timer 12 completes the timer operation for the predetermined time T1 while the abnormality notification from the drive logic judging circuit 9a or the abnormal current judging circuit 6a to the drive abnormality detecting circuit 7a continues without interruption, the latch circuit 13 holds the abnormality notification from the drive logic judging circuit 9a or the abnormal current judging circuit 6a. During a period when the latch circuit 13 holds the abnormality notification, the diagnosis lamp 19 is lit and the motor drive inhibiting circuit 14 is operated so that the motor 4 is inhibited from being driven. During this period, when the motor non-drive detecting circuit 11 detects that the motor current target value is zero, the latch circuit 13 is cleared and the operation of the motor drive inhibiting circuit 14 is stopped so that the inhibition of the drive of the motor 4 is canceled.

The CPU 2 determines the assist current and the steering wheel return current on the basis of the torque signal, and performs the angular velocity difference control (differential control of the torque signal). Therefore, the state occurs instantaneously where, although the direction in which the motor 4 is to be driven in accordance with the motor current target value is opposite to the direction of the detected torque or the detected torque is inside the dead zone, the driving current of the motor 4 is large. As a result, even though the CPU 2 is normal (is not running away), a drive abnormality may be detected. In the first embodiment, therefore, the predetermined time T1 of the detection timer 12 must be set longer than a period when the drive abnormality detecting circuit 7a operates in a normal state.

By contrast, in the electric power steering apparatus of the second embodiment, the relationship between the direction in which the motor is to be driven in accordance with the motor current target value and that of the detected torque, and the relationship between the direction in which the motor is driven by the motor driving current and the change direction of the detected torque are added to the conditions for detecting a drive abnormality, whereby the predetermined time T1 of the detection timer 12 can be set to be shorter. Consequently, in the electric power steering apparatus of the second embodiment, when the CPU 2 is normal, the detection timer 12 does not erroneously detect that the CPU 2 runs away, and, when the CPU 2 runs away, the motor 4 can rapidly be turned off.

Unless the apparatus is configured so that the latch circuit 13 is not cleared unless the motor non-drive detecting circuit 11 once detects that the motor current target value is zero (non-driven), a problem arises as discussed below. In the situation where the CPU 2 runs away and the motor current target value becomes excessive, even when the detected torque is inside the dead zone, a large current flows through the motor 4 during the period when the detection timer 12 performs the timer operation for the predetermined time T1, whereby the steering wheel is caused to self-rotate. The self-rotation of the steering wheel produces a detected torque the direction of which is opposite to the driving direction of the motor 4, which is driven by the driving current. Therefore, the drive logic judging circuit 9a judges an abnormality and notifies (reports) it. Accordingly, the motor is inhibited from being driven and an assist-off state is established, thereby causing the steering wheel to return in the opposite direction. At this time, the judgment of the drive logic judging circuit 9a indicates normal, and as a result a large current flows again. The above process is repeated with the result that the operation of the electric power steering apparatus becomes unstable.

When the definition timer 15 completes the timer operation for the predetermined time T2 while the abnormality notification from the drive logic judging circuit 9a or the abnormal current judging circuit 6a to the drive abnormality detecting circuit 7a continues without interruption, the latch circuit 16 holds the abnormality notification from the drive logic judging circuit 9a or the abnormal current judging circuit 6a. During a period when the latch circuit 16 holds the abnormality notification, the diagnosis lamp 19 is lit and the relay drive inhibiting circuit 17 is operated so that the fail safe relay 18 is turned off and the power source of the motor drive circuit 3 is turned off. When the power source of the electric power steering apparatus is turned off (when the ignition key is turned off), the latch circuit 16 is cleared.

When the CPU 2 detects the non-drive state of the motor, the detection timer 12 is reset. Depending on the runaway state of the CPU 2, therefore, the detection and the reset are repeated so that an unstable state may be caused. To avoid this, the predetermined time T2 of the definition timer 15 is set sufficiently longer than the predetermined time T1 of the detection timer 12, and, when a drive abnormality is continued for the predetermined time T2, the fault is determined.

During a period when the logic is not held that the detected torque is outside the dead zone, the direction in which the motor 4 is to be driven in accordance with the motor current target value is opposite to the direction of the detected torque, and the direction in which the motor 4 is to be driven in accordance with the motor current target value is opposite to the change direction of the detected torque, the drive logic judging circuit 9a judges that the apparatus is normal, and does not notify the drive abnormality detecting circuit 7a of an abnormality. During a period when the conditions are not satisfied that the detected torque is inside the dead zone, the driving current of the motor 4 is greater than the predetermined value, and the direction in which the motor 4 is to be driven in accordance with the motor driving current is opposite to the change direction of the detected torque, the abnormal current judging circuit 6a does not notify the drive abnormality detecting circuit 7a of an abnormality. During a period when the drive logic judging circuit 9a or the abnormal current judging circuit 6a does not notify of an abnormality, the drive abnormality detecting circuit 7a stops the detection timer 12 and the definition timer 15. Therefore, the latch circuits 13 and 16 do not hold an abnormality notification and as a result the motor drive inhibiting circuit 14 and the relay drive inhibiting circuit 17 are not activated.

In addition to the features of the first embodiment, the electric power steering apparatus of the second embodiment includes the feature that runaway of a CPU can be detected in a short time and a sufficient safety countermeasure can be taken.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus in which a motor current target value of a steering force assisting motor is determined on the basis of a torque detected by a torque sensor, a drive of said motor is controlled using the motor current target value as a target value of an automatic control, and using a driving current of said motor as a feedback value of the automatic control, and, when the detected torque is within a predetermined range, said motor is inhibited from being driven in a direction opposite to the detected torque, said apparatus comprising:

non-drive detecting means for detecting that the motor current target value is zero; and drive inhibition holding means for holding a motor drive inhibition state where said motor is inhibited from being driven in the direction opposite to the detected torque, until said non-drive detecting means detects that the motor current target value is zero;

dead zone detecting means for detecting a dead zone of the detected torque where the motor current target value is to be zero;

abnormal state detecting means for detecting a state where the detected torque is outside the dead zone and the direction in which said motor is to be driven in accordance with the motor current target value is opposite to the direction of the detected torque; and drive inhibiting means for, when said abnormal state detecting means detects the abnormal state, inhibiting said motor from being driven.

2. An electric power steering apparatus in which a motor current target value of a steering force assisting motor is determined on the basis of a torque detected by a torque sensor, a drive of said motor is controlled using the motor current target value as a target value of an automatic control, and using a driving current of said motor as a feedback value of the automatic control, and, when the detected torque is within a predetermined range, said motor is inhibited from being driven in a direction opposite to the detected torque, said apparatus comprising:

non-drive detecting means for detecting that the motor current target value is zero; and drive inhibition holding means for holding a motor drive inhibition state where said motor is inhibited from being driven in the direction opposite to the detected torque, until said non-drive detecting means detects that the motor current target value is zero;

dead zone detecting means for detecting a dead zone of the detected torque where the motor current target value is to be zero;

abnormal state detecting means for detecting a state where the detected torque is inside the dead zone and the driving current of said motor is greater than a predetermined value; and drive inhibiting means for, when said abnormal state detecting means detects the abnormal state, inhibiting said motor from being driven.

3. An electric power steering apparatus according to claim 2, wherein the predetermined value is greater than a maximum value of a return current of a steering wheel.

4. An electric power steering apparatus in which a motor current target value of a steering force assisting motor is determined on the basis of a torque detected by a torque sensor, a drive of said motor is controlled using the motor current target value as a target value of an automatic control, and using a driving current of said motor as a feedback value of the automatic control, and, when the detected torque is within a predetermined range, said motor is inhibited from being driven in a direction opposite to the detected torque, said apparatus comprising:

non-drive detecting means for detecting that the motor current target value is zero; and drive inhibition holding means for holding a motor drive inhibition state where said motor is inhibited from being driven in the direction opposite to the detected torque, until said non-drive detecting means detects that the motor current target value is zero;

dead zone detecting means for detecting a dead zone of the detected torque where the motor current target value is to be zero;

first abnormal state detecting means for detecting a first state where the detected torque is outside the dead zone and the direction in which said motor is to be driven in accordance with the motor current target value is opposite to the direction of the detected torque;

second abnormal state detecting means for detecting a second state where the detected torque is inside the dead zone and the driving current of said motor is greater than a predetermined value; and drive inhibiting means for, when the first state or the second state is detected, inhibiting said motor from being driven.

5. An electric power steering apparatus according to claim 4, wherein the predetermined value is greater than a maximum value of a return current of a steering wheel.

6. An electric power steering apparatus according to claim 4, further comprising:

a first timer which, when the first state or the second state is detected, starts a timer operation for a first predetermined time, and which, when the first state or the second state is not detected any longer, is reset; and drive inhibiting means for, when said first timer completes the timer operation for the first predetermined time, inhibiting said motor from being driven.

7. An electric power steering apparatus according to claim 6, further comprising:

a second timer which, when the first state or the second state is detected, starts a timer operation for a second predetermined time, and which, when the first state or the second state is not detected any longer, is reset;

abnormality detection signal holding means for, when said second timer completes the timer operation for the second predetermined time, holding an abnormality detection signal from said first abnormal state detecting means or said second abnormal state detecting means; and relay drive inhibiting means for, during a period when said abnormality detection signal holding means holds the abnormality detection signal, turning off a fail safe relay, said fail safe relay connecting a drive circuit for said motor with a power source.

8. An electric power steering apparatus according to claim 7, wherein the second predetermined time is longer than the first predetermined time.

9. An electric power steering apparatus according to claim 7, further comprising an indication lamp which is lit during a period when said drive inhibition holding means holds the motor drive inhibition state of said motor, or during a period when said abnormality detection signal holding means holds the abnormality detection signal.

10. An electric power steering apparatus in which a motor current target value of a steering force assisting motor is determined on the basis of a torque detected by a torque sensor, a drive of said motor is controlled using the motor current target value as a target value of an automatic control, and using a driving current of said motor as a feedback value of the automatic control, and, when the detected torque is within a predetermined range, said motor is inhibited from being driven in a direction opposite to the detected torque, said apparatus comprising:

non-drive detecting means for detecting that the motor current target value is zero; and drive inhibition holding means for holding a motor drive inhibition state where said motor is inhibited from being driven in the direction opposite to the detected torque, until said non-drive detecting means detects that the motor current target value is zero;

dead zone detecting means for detecting a dead zone of the detected torque where the motor current target value is to be zero;

torque change direction detecting means for detecting a change direction of the detected torque;

abnormal state detecting means for detecting a state where the detected torque is outside the dead zone, the direction in which said motor is to be driven in accordance with the motor current target value is opposite to the direction of the detected torque, and the direction in which said motor is to be driven in accordance with the motor current target value is opposite to the change direction of the detected torque; and drive inhibiting means for, when said abnormal state detecting means detects the abnormal state, inhibiting said motor from being driven.

11. An electric power steering apparatus in which a motor current target value of a steering force assisting motor is determined on the basis of a torque detected by a torque sensor, a drive of said motor is controlled using the motor current target value as a target value of an automatic control, and using a driving current of said motor as a feedback value of the automatic control, and, when the detected torque is within a predetermined range, said motor is inhibited from being driven in a direction opposite to the detected torque, said apparatus comprising:

non-drive detecting means for detecting that the motor current target value is zero; and drive inhibition holding means for holding a motor drive inhibition state where said motor is inhibited from being driven in the direction opposite to the detected torque, until said non-drive detecting means detects that the motor current target value is zero;

dead zone detecting means for detecting a dead zone of the detected torque where the motor current target value is to be zero;

torque change direction detecting means for detecting a change direction of the detected torque;

abnormal state detecting means for detecting a state where the detected torque is inside the dead zone, the driving current of said motor is greater than a predetermined value, and the direction in which said motor is driven by the driving current is opposite to the change direction of the detected torque; and drive inhibiting means for, when said abnormal state detecting means detects the abnormal state, inhibiting said motor from being driven.

12. An electric power steering apparatus according to claim 11, wherein the predetermined value is greater than a maximum value of a return current of a steering wheel.

13. An electric power steering apparatus in which a motor current target value of a steering force assisting motor is determined on the basis of a torque detected by a torque sensor, a drive of said motor is controlled using the motor current target value as a target value of an automatic control, and using a driving current of said motor as a feedback value of the automatic control, and, when the detected torque is within a predetermined range, said motor is inhibited from being driven in a direction opposite to the detected torque, said apparatus comprising:

non-drive detecting means for detecting that the motor current target value is zero; and drive inhibition holding means for holding a motor drive inhibition state where said motor is inhibited from being driven in the direction opposite to the detected torque, until said non-drive detecting means detects that the motor current target value is zero;

dead zone detecting means for detecting a dead zone of the detected torque where the motor current target value is to be zero;

torque change direction detecting means for detecting a change direction of the detected torque;

third abnormal state detecting means for detecting a third state where the detected torque is outside the dead zone, the direction in which said motor is to be driven in accordance with the motor current target value is opposite to the direction of the detected torque, and the direction in which said motor is to be driven in accordance with the motor current target value is opposite to the change direction of the detected torque;

fourth abnormal state detecting means for detecting a fourth state where the detected torque is inside the dead zone, the driving current of said motor is greater than a predetermined value, and the direction in which said motor is driven by the driving current is opposite to the change direction of the detected torque; and drive inhibiting means for, when the third state or the fourth state is detected, inhibiting said motor from being driven.

14. An electric power steering apparatus according to claim 13, wherein the predetermined value is greater than a maximum value of a return current of a steering wheel.

15. An electric power steering apparatus according to claim 13, further comprising:

a first timer which, when the third state or the fourth state is detected, starts a timer operation for a first predetermined time, and which, when the third state or the fourth state is not detected any longer, is reset; and drive inhibiting means for, when said first timer completes the timer operation for the first predetermined time, inhibiting said motor from being driven.

16. An electric power steering apparatus according to claim 15, further comprising:

a second timer which, when the third state or the fourth state is detected, starts a timer operation for a second predetermined time, and which, when the third state or the fourth state is not detected any longer, is reset;

abnormality detection signal holding means for, when said second timer completes the timer operation for the second predetermined time, holding an abnormality detection signal from said third abnormal state detecting means or said fourth abnormal state detecting means; and relay drive inhibiting means for, during a period when said abnormality detection signal holding means holds the abnormality detection signal, turning off a fail safe relay, said fail safe relay connecting a drive circuit for said motor with a power source.

17. An electric power steering apparatus according to claim 16, wherein the second predetermined time is longer than the first predetermined time.

18. An electric power steering apparatus according to claim 16, further comprising an indication lamp which is lit during a period when said drive inhibition holding means holds the motor drive inhibition state of said motor, or during a period when said abnormality detection signal holding means holds the abnormality detection signal.

19. An electric power steering apparatus comprising:

a torque sensor which detects a torque;

a motor for assisting a steering force;

controlling means for determining a current target value of said motor on the basis of a torque detected by said torque sensor, and for controlling a drive of said motor using the current target value as a target value of an automatic control, and using a driving current of said motor as a feedback value of the automatic control;

drive inhibiting means for, when the detected torque is within a predetermined range, inhibiting said motor from being driven in a direction opposite to the detected torque;

non-drive detecting means for detecting that the current target value of said motor is zero; and drive inhibition holding mean for holding a motor drive inhibition state where said motor is inhibited from being driven in the direction opposite to the detected torque, until said non-drive detecting means detects that the current target value is zero;

dead zone detecting means for detecting a dead zone of the detected torque where the motor current target value is to be zero;

abnormal state detecting means for detecting a state where the detected torque is outside the dead zone and the direction in which said motor is to be driven in accordance with the motor current target value is opposite to the direction of the detected torque; and drive inhibiting means for, when said abnormal state detecting means detects the abnormal state, inhibiting said motor from being driven.

* * * * *